United States Patent
Mouret et al.

(10) Patent No.: US 12,312,282 B2
(45) Date of Patent: May 27, 2025

(54) ENVIRONMENTAL BARRIER FOR A SUBSTRATE COMPRISING FREE SILICON

(71) Applicants: SAFRAN CERAMICS, Le Haillan (FR); UNIVERSITE DE BORDEAUX, Bordeaux (FR); CENTRE NATIONAL DE LA RECHERCHE SCIENTIFIQUE, Paris (FR)

(72) Inventors: Thibault Mouret, Bordeaux (FR); Francis Rebillat, Pessac (FR); Laurence Maille, Bordeaux (FR); Simon Arnal, Moissy-Cramayel (FR); Eric Bouillon, Moissy-Cramayel (FR)

(73) Assignees: SAFRAN CERAMICS, Le Haillan (FR); UNIVERSITE DE BORDEAUX, Bordeaux (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 0 days.

(21) Appl. No.: 18/576,024

(22) PCT Filed: Jun. 30, 2022

(86) PCT No.: PCT/FR2022/051305
§ 371 (c)(1),
(2) Date: Jan. 2, 2024

(87) PCT Pub. No.: WO2023/281186
PCT Pub. Date: Jan. 12, 2023

(65) Prior Publication Data
US 2024/0262759 A1    Aug. 8, 2024

(30) Foreign Application Priority Data
Jul. 7, 2021 (FR) .................... 2107337

(51) Int. Cl.
*C04B 41/87* (2006.01)
*C04B 35/16* (2006.01)
(Continued)

(52) U.S. Cl.
CPC .............. *C04B 41/87* (2013.01); *C04B 35/16* (2013.01); *C04B 35/565* (2013.01); *C04B 35/64* (2013.01);
(Continued)

(58) Field of Classification Search
CPC ....... C04B 41/87; C04B 35/16; C04B 35/565; C04B 35/64; C04B 41/5024;
(Continued)

(56) References Cited

U.S. PATENT DOCUMENTS 10,604,454 B1 * 3/2020 Zhu .................. C04B 41/89
2018/0037515 A1   2/2018 Matsumoto et al.
2019/0330121 A1 * 10/2019 Pin .................. F01D 5/288

FOREIGN PATENT DOCUMENTS

WO   WO-2020047278 A1 * 3/2020 ........... C04B 28/006

OTHER PUBLICATIONS

International Search Report as issued in International Phase Application No. PCT/FR2022/051305, dated Oct. 20, 2022.
(Continued)

*Primary Examiner* — Shane Fang
(74) *Attorney, Agent, or Firm* — Pillsbury Winthrop Shaw Pitman LLP

(57) ABSTRACT

A part includes a substrate of ceramic matrix composite material, the substrate including silicon, the part further including an environmental barrier formed on at least one surface of the substrate, wherein the environmental barrier includes at least one compound selected from $Yb_{2-2\gamma}Gd_{2\gamma}SiO_5$ and $Yb_{2-2\gamma}Gd_{2\gamma}Si_2O_7$, where $\gamma$ is between 0.05 and 0.15, and wherein the environmental barrier further (Continued)

includes alumina $Al_2O_3$, the molar alumina content being between 5% and 15% of the total environmental barrier composition.

12 Claims, 1 Drawing Sheet

(51) Int. Cl.
*C04B 35/565* (2006.01)
*C04B 35/64* (2006.01)
*C04B 41/50* (2006.01)

(52) U.S. Cl.
CPC .. *C04B 41/5024* (2013.01); *C04B 2235/3217* (2013.01); *C04B 2235/3224* (2013.01); *C04B 2235/3418* (2013.01); *C04B 2235/3826* (2013.01); *C04B 2235/428* (2013.01)

(58) Field of Classification Search
CPC .... C04B 2235/3217; C04B 2235/3224; C04B 2235/3418; C04B 2235/3826; C04B 2235/428
See application file for complete search history.

(56) References Cited

OTHER PUBLICATIONS

Written Opinion of the International Searching Authority as issued in International Phase Application No. PCT/FR2022/051305, dated Oct. 20, 2022.

* cited by examiner

[Fig. 1]
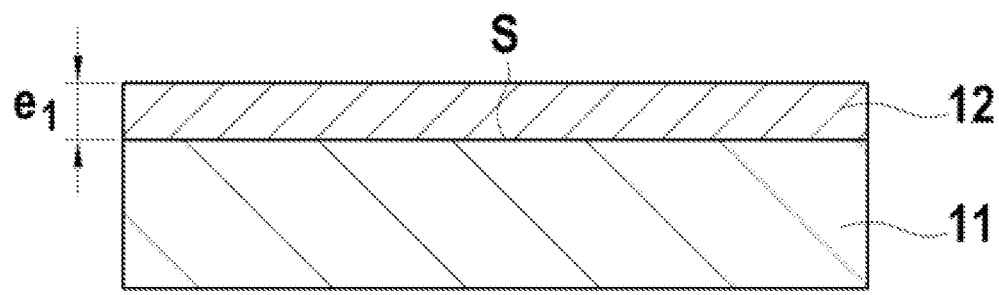
[Fig. 2]
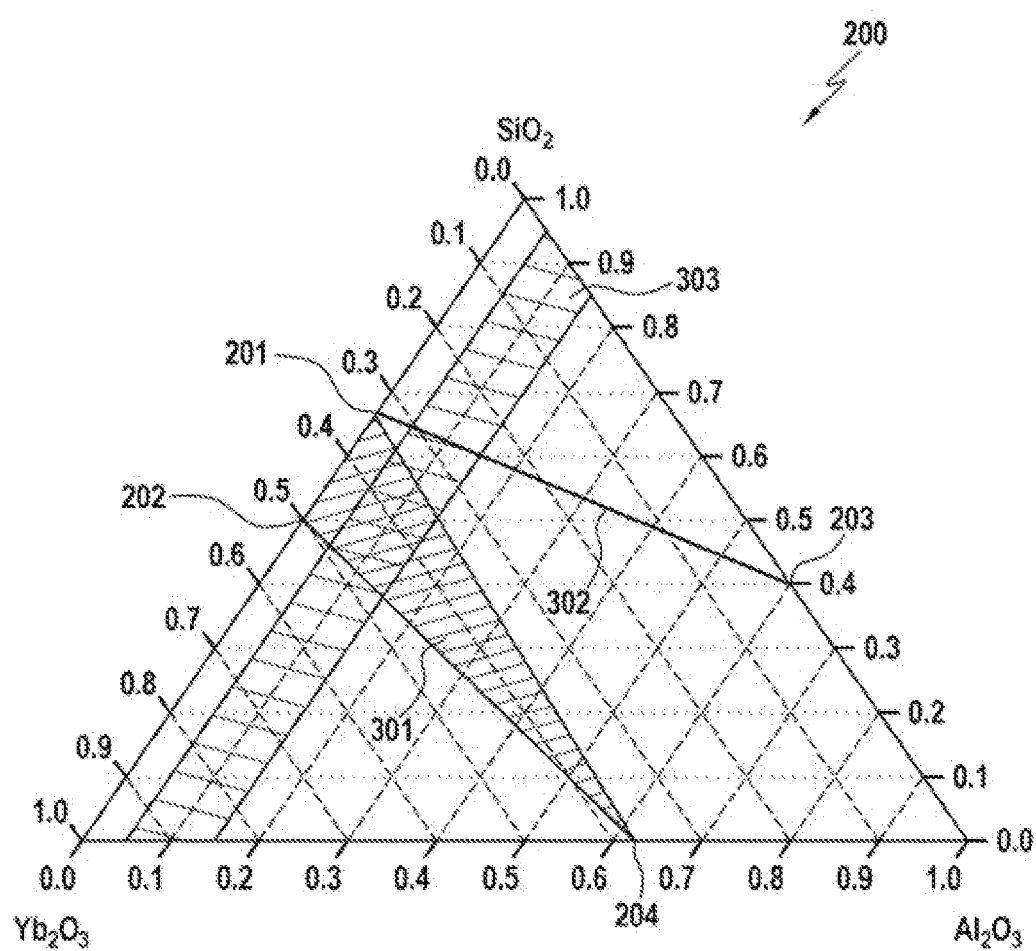

ENVIRONMENTAL BARRIER FOR A SUBSTRATE COMPRISING FREE SILICON

CROSS-REFERENCE TO RELATED APPLICATIONS

This application is the U.S. National Stage of PCT/FR2022/051305, filed Jun. 30, 2022, which in turn claims priority to French patent application number 2107337 filed Jul. 7, 2021. The content of these applications are incorporated herein by reference in their entireties.

TECHNICAL FIELD

The invention relates to the field of ceramic matrix composite (CMC) materials, and more specifically to the field of environmental barriers to be applied to such materials.

PRIOR ART

CMC materials have good mechanical properties, allowing them to be used as structural components, and these properties are advantageously maintained at high temperatures.

However, these CMC materials can degrade when used at high temperatures and in a corrosive environment, as is the case when they are present in aeronautical turbines. When the CMC part includes a silicon carbide (SiC) matrix, corrosion of the CMC results in oxidation of the SiC to silica, which volatilizes in the presence of water vapor in the form of $Si(OH)_4$ hydroxides. Corrosion leads to premature degradation of CMC. Environmental barrier coatings (EBC) have therefore been developed to protect CMC materials from high-temperature corrosion.

An example of a suitable environmental barrier is a multilayer assembly comprising a silicon bonding layer and a layer of a rare-earth silicate (type $RE_2Si_2O_7$ or $RE_2SiO_5$, e.g., $Y_2Si_2O_7$).

These environmental barriers are very generally obtained by thermal spraying of powder, or by liquid process, generally followed by a sintering/densification heat treatment.

Environmental barriers obtained in this way offer many advantages, but there are still situations in which they are difficult to use. For example, when a very tight barrier is required, it is generally recommended to increase the sintering temperature. Unfortunately, such an increase in sintering temperature is not compatible with substrates comprising free silicon, as such substrates thermally decompose when the temperature rises above 1400° C.

The conventional method of reducing the sintering temperature, and thus increasing the tightness of the environmental barrier without damaging the substrate, is to add a sintering agent, such as MgO or $Fe_2O_3$, to the environmental barrier. However, these sintering agents are not compatible with barriers possessing self-healing capabilities, which are particularly desirable for certain applications. Indeed, MgO and $Fe_2O_3$ compounds could alter the stability of the liquid phase of a self-healing environmental barrier. Moreover, when the porosity of the environmental barrier is reduced, their role as sintering aids is diminished, as is generally the case when a very high level of environmental barrier tightness is desired.

When self-healing capabilities are desired for environmental barriers, it is proposed to use $Al_2O_3$ alumina as a sintering agent. Unfortunately, this solution is not applicable for environmental barriers comprising ytterbium silicate $Yb_2Si_2O_7$, as the liquid phase formation temperature for alumina and ytterbium silicate compositions remains higher than the permissible temperatures for substrates comprising free silicon.

However, for some applications, environmental barriers using ytterbium silicate ($Yb_2SiO_5$ and/or $Yb_2Si_2O_7$), rather than yttrium silicate ($Y_2SiO_5$ and/or $Y_2Si_2O_7$), for example, are preferred, as such barriers have been shown to have better resistance to recession and less ionic diffusion.

Consequently, there is still a need for an environmental barrier comprising ytterbium silicate ($Yb_2SiO_5$ and/or $Yb_2Si_2O_7$) and featuring both very high density and self-healing capabilities that can be applied to substrates comprising free silicon.

DISCLOSURE OF THE INVENTION

This invention is specifically designed to meet the need described above.

It concerns a part comprising a substrate of ceramic matrix composite material, the substrate comprising silicon, the part further comprising an environmental barrier formed on at least one surface of the substrate, the part being characterized in that the environmental barrier comprises at least one compound selected from $Yb_{2-2\gamma}Gd_{2\gamma}SiO_5$, $Yb_{2-2\gamma}Gd_{2\gamma}Si_2O_7$, where $\gamma$ is between 0.05 and 0.15,
and in that the environmental barrier further comprises alumina $Al_2O_3$, the molar alumina content being between 5% and 15% relative to the total environmental barrier composition.

Such a part provides excellent resistance to oxidation thanks to the presence of ytterbium silicate, while allowing the use of a substrate with free silicon.

Substituting a portion of the ytterbium with gadolinium in the environmental barrier, in conjunction with the presence of alumina, allows the environmental barrier to have a portion of liquid phase when brought to a temperature higher than 1300° C.

When the environmental barrier is formed by heat treatment, the presence of this liquid phase allows very high densification to be achieved, as the liquid phase promotes granular rearrangement. The high density of the environmental barrier gives it excellent impermeability to oxidizing and corrosive species, and good substrate protection.

Moreover, when in use, and at temperatures higher than 1300° C., the presence of the liquid phase in the environmental barrier allows it to repair cracking damage and ensure the relaxation of thermomechanical stresses occurring in the range of use. These self-healing properties of the environmental barrier in the operating range prevent cracks from forming, and thus ensure a longer service life for the coated part.

In one embodiment, the part further comprises a bonding layer comprising silicon present between the substrate surface and the environmental barrier.

This layer improves the bonding of the rare-earth silicate layer and forms a protective silica layer whose low oxygen permeability helps protect the CMC from oxidation.

In one embodiment, the substrate is a composite part whose matrix comprises silicon carbide, or even a composite material whose fibrous reinforcement and matrix comprise silicon carbide.

In one embodiment, the environmental barrier may jointly comprise the compounds $Yb_{2-2\gamma}Gd_{2\gamma}SiO_5$, $Yb_{2-2\gamma}Gd_{2\gamma}Si_2O_7$, where $\gamma$ is between 0.05 and 0.15. The environmental barrier then comprises a rare earth monosilicate and a rare earth disilicate, said rare earth being ytterbium partially substituted by gadolinium.

In this embodiment, the environmental barrier composition is selected within a range of the $Yb_2O_3$—$Al_2O_3$—$SiO_2$ ternary diagram between ytterbium monosilicate, ytterbium disilicate and ytterbium-aluminum garnets, on the understanding that some of the ytterbium is substituted by gadolinium.

By selecting the precise environmental barrier composition in this range of the ternary diagram, and in particular the alumina content and the rate of substitution of gadolinium for ytterbium, the amount of liquid phase present in the environmental barrier can be precisely determined, giving the barrier the desired self-healing properties.

In another embodiment, the environmental barrier comprises only one of the compounds selected from $Yb_{2-2\gamma}Gd_{2\gamma}SiO_5$, $Yb_{2-2\gamma}Gd_{2\gamma}Si_2O_7$, where $\gamma$ is between 0.05 and 0.15. In one embodiment, the only species in the environmental barrier layer comprising a rare earth are an ytterbium disilicate and a gadolinium disilicate.

For example, the environmental barrier layer may have a composition lying, in the $Yb_2O_3$—$Al_2O_3$—$SiO_2$ ternary diagram, on the isopleth from ytterbium disilicate to mullite, it being understood that some of the ytterbium is substituted by gadolinium.

Without intending to be limited by theory, the inventors believe that the substitution rate of gadolinium for ytterbium makes it possible to precisely determine the amount of liquid phase present in the environmental barrier, thus giving the barrier the desired self-healing properties.

In one embodiment, the environmental barrier has a densification rate higher than or equal to 98%. Such a rate can advantageously be achieved for an environmental barrier according to the invention at temperatures compatible with a substrate comprising free silicon.

Such a densification rate results in a barrier that is more impermeable to gases than prior art environmental barriers, and therefore improves the protective character of the environmental barrier.

In one embodiment, the substrate can be an aeronautical turbomachinery part, for example a high-pressure turbine part or a low-pressure turbine part. For example, the part may be a nozzle, a combustion chamber wall, a turbine ring sector, a turbomachine blade or part of one of these parts.

According to another aspect, the invention concerns a method for protecting a substrate, a portion of which adjacent to a surface is made of a material comprising silicon, during high-temperature use in an oxidizing and humid environment, by forming an environmental barrier on the substrate surface, characterized in that an environmental barrier is formed which comprises at least one compound selected from $Yb_{2-2\gamma}Gd_{2\gamma}SiO_5$, $Yb_{2-2\gamma}Gd_{2\gamma}Si_2O_7$ where $\gamma$ is between 0.05 and 0.15, and alumina ($Al_2O_3$) in a molar content of between 5% and 15% relative to the total environmental barrier composition, the environmental barrier maintaining a majority solid phase up to at least 1400° C. and presenting a liquid phase at a temperature higher than or equal to 1300° C., so that the quantity of liquid phase ensures the self-healing capacity of the barrier for a temperature of use higher than or equal to 1300° C.

Such a method allows the protection of a substrate comprising silicon by means of a self-healing environmental barrier. Indeed, the quantity of liquid phase ensures that the environmental barrier is capable of filling any cracks that may appear during use of the part. Furthermore, the method of the invention is still compatible with a substrate comprising silicon, as the environmental barrier has a liquid phase at a temperature lower than 1400° C.

In one embodiment, the formation of the environmental barrier comprises a sintering step of ytterbium oxide powder ($Yb_2O_3$), gadolinium oxide powder ($Gd_2O_3$), alumina powder ($Al_2O_3$) and silica powder ($SiO_2$) at a temperature of between 1300° C. and 1400° C., the proportion of powders being determined so as to obtain a part as described above.

Sintering allows very high densification of the environmental barrier. Indeed, the liquid phase in the environmental barrier favors granular rearrangement, which increases densification compared to environmental barriers without this liquid phase.

In one embodiment, the method also includes a step for obtaining a silicon-containing bonding layer on the substrate surface, prior to the formation of the environmental barrier.

BRIEF DESCRIPTION OF THE DRAWINGS

FIG. 1 is a very schematic representation of an embodiment of the invention.

FIG. 2 is a schematic representation of a $Yb_2O_3$—$Al_2O_3$—$SiO_2$ ternary diagram.

DESCRIPTION OF EMBODIMENTS

The following description relates to particular embodiments of the invention, illustrated for ease of understanding. These particular embodiments should not be construed as limiting the scope of the invention.

FIG. 1 is a very schematic representation of a substrate 11 provided with an environmental barrier 12 on its S surface, according to one embodiment.

The substrate 11, made of a ceramic matrix composite material comprising silicon, includes a fibrous reinforcement which may be made of carbon fibers or ceramic fibers, such as silicon carbide (SiC) fibers. The SiC fibers may or may not be coated with a thin interphase layer of, for example, pyrolytic carbon (PyC), boron nitride (BN) or boron-doped carbon (BC, with 5 atomic % to 20 atomic % boron, the balance being carbon). The fibrous reinforcement is densified by a matrix comprising silicon. For example, the matrix may be silicon carbide SiC.

In a preferred embodiment, the substrate 11 is impregnated with the matrix using the melt infiltration method, in which a powder, e.g., carbon or ceramic, is dispersed in the porosities of the fibrous reinforcement, which is then infiltrated by liquid silicon to react with the dispersed powder and form the matrix directly in the porosities of the fibrous reinforcement.

The environmental barrier 12 is formed over the entire outer surface of the substrate 11, or over only a portion of this surface, for example if only a portion of the substrate 11 is to be protected.

In one embodiment, the environmental barrier 12 can be deposited directly in contact with the outer surface of the substrate.

As described above, environmental barrier 12 has a composition selected so that it exhibits self-healing properties.

In one embodiment, a bonding layer, not shown, can be formed between substrate 11 and environmental barrier 12. The bonding layer comprises silicon, and may be, for example, mullite ($3Al_2O_3 \cdot 2SiO_2$).

The bonding layer can be obtained by methods known per se.

In one embodiment, the bonding layer can be formed directly in contact with the substrate 11.

In one embodiment, the environmental barrier 12 can be formed directly in contact with the bonding layer.

FIG. 2 illustrates the $Yb_2O_3$—$Al_2O_3$—$SiO_2$ ternary diagram 200, and identifies the compositions and areas of interest for the present invention.

In particular, this ternary diagram 200 illustrates:
Ytterbium monosilicate 202,
ytterbium disilicate 201,
mullite 203; and
ytterbium aluminum garnet 204.

Furthermore, range 301 corresponds to the range extending between ytterbium monosilicate 202, ytterbium disilicate 201, and ytterbium aluminum garnet 204.

Straight line 302 is the isopleth extending between ytterbium disilicate 201 and mullite 203.

Range 303 corresponds to compositions with an alumina content of between 5% and 15%.

As described above, the environmental barrier 12 comprises a compound selected from $Yb_{2-2\gamma}Gd_{2\gamma}SiO_5$ and $Yb_{2-2\gamma}Gd_{2\gamma}Si_2O_7$, where $\gamma$ is between 0.05 and 0.15, and alumina $Al_2O_3$, the molar alumina content being between 5% and 15% relative to the total environmental barrier composition.

The formulation $Yb_{2-2\gamma}Gd_{2\gamma}SiO_5$, and respectively $Yb_{2-2\gamma}Gd_{2\gamma}Si_2O_7$, where $\gamma$ is between 0.05 and 0.15 is understood as an ytterbium mono-silicate, respectively an ytterbium disilicate, for which a portion of the ytterbium has been replaced by gadolinium.

The inventors have found that replacing a portion of the ytterbium with gadolinium promotes the presence of liquid phase in the environmental barrier.

It is important to select the environmental barrier composition precisely, so that the quantity of liquid phase is determined in such a way that, on the one hand, it is not too high, as it would then risk being rapidly degraded by too great a flow of hot gas, and, on the other hand, it is sufficiently high to allow obtaining the desired self-healing properties.

For example, the environmental barrier composition can be selected so that the amount of liquid phase is between 5% and 40% by mass relative to the total mass of the environmental barrier for the operating temperature, e.g., for a temperature between 1350° C. and 1400° C.

In one embodiment, substituting a portion of the ytterbium by gadolinium is achieved by introducing, as soon as the environmental barrier is formed, the desired amount of gadolinium in the same form as the ytterbium.

For example, gadolinium can be present in such a way that the ratio between the molar quantity of ytterbium and that of gadolinium is between 85/15 and 95/5, or even between 86/14 and 90/10.

In an environmental barrier according to the invention, alumina is present in a molar content of between 5% and 15% relative to the total environmental barrier composition.

It is understood by this formulation that it is the equivalent alumina content that is between 5% and 15%. In other words, the environmental barrier composition is located, in the $Yb_2O_3$—$Al_2O_3$—$SiO_2$ ternary diagram 200, in the range 303 corresponding to an alumina concentration of between 5% and 15%. For example, if the barrier comprises ytterbium aluminum garnet 204, then it will be understood that the barrier comprises alumina.

In one embodiment, the barrier comprises alumina in the form of $Al_2O_3$.

In one embodiment, the two compounds $Yb_{2-2\gamma}Gd_{2\gamma}SiO_5$ and $Yb_{2-2\gamma}Gd_{2\gamma}Si_2O_7$ are present together in the environmental barrier.

In this embodiment, the environmental barrier composition then lies in the range of the $Yb_2O_3$—$Al_2O_3$—$SiO_2$ ternary diagram 200 between ytterbium monosilicate 202, ytterbium disilicate 201 and ytterbium-aluminum garnets 204, with the provision that the molar alumina content is between 5% and 15%.

In one embodiment, the environmental barrier comprises only one of the two compounds selected from $Yb_{2-2\gamma}Gd_{2\gamma}SiO_5$ and $Yb_{2-2\gamma}Gd_{2\gamma}Si_2O_7$, and preferably comprises only $Yb_{2-2\gamma}Gd_{2\gamma}Si_2O_7$, where $\gamma$ is between 0.05 and 0.15, and alumina $Al_2O_3$, the molar alumina content being between 5% and 15% relative to the total environmental barrier composition.

For example, in this embodiment, the environmental barrier composition lies, in the $Yb_2O_3$—$Al_2O_3$—$SiO_2$ ternary diagram 200, on the isopleth 203 from ytterbium disilicate 201 to mullite 203.

This means that the environmental barrier composition comprises a binary mixture of these two phases.

It is always understood that some of the ytterbium is substituted by gadolinium as described above.

In this embodiment, the environmental barrier is then easily prepared, for example from a powder comprising ytterbium disilicate, a powder containing gadolinium disilicate and mullite.

In one embodiment, the environmental barrier extends, in a direction perpendicular to the substrate surface, to a thickness e1 of between 50 μm and 100 μm.

In one embodiment, the environmental barrier is not covered. This is particularly advantageous when the environmental barrier alone is sufficient to provide the substrate with sufficient resistance to the environment it faces.

The method of obtaining the environmental barrier layer is now described.

If present, the bonding layer can be obtained in a manner known per se, for example by thermal spraying of a powder mixture.

The environmental barrier is then created on the surface of the substrate, or where appropriate on the surface of the bonding layer.

The environmental barrier can be created by sintering a plurality of powders comprising the components making up the environmental barrier.

In one embodiment, the powders of the plurality of powders can be selected from: ytterbium oxide powder, gadolinium oxide powder, ytterbium monosilicate powder, ytterbium disilicate powder, gadolinium monosilicate powder, gadolinium disilicate powder, alumina powder, mullite powder, ytterbium aluminum garnet powder, gadolinium aluminum garnet powder, silica powder.

In a preferred embodiment, the environmental barrier is obtained by a sintering step of ytterbium oxide powder ($Yb_2O_3$), gadolinium oxide powder ($Gd_2O_3$), alumina powder ($Al_2O_3$) and silica powder ($SiO_2$) at a temperature of between 1300° C. and 1400° C., the proportion of the powders being determined so as to obtain a part as described above.

Obviously, the precise amount of powder will be determined to obtain the desired environmental barrier composition.

The powders can, for example, be deposited by a thermal spraying method of solid powders.

The deposited powders can then be sintered at a temperature of between 1300° C. and 1400° C. to obtain excellent densification of the environmental barrier while guaranteeing the integrity of the substrate comprising free silicon.

As described above, the environmental barrier composition as described allows a liquid phase to be obtained during the initial sintering treatment, which allows the density of the barrier to be increased compared with prior art barriers.

In addition, the composition confers self-healing capabilities on the barrier, as the rise in operating temperature will allow the formation of the liquid phase, which will make it easier to re-seal cracks and also provide better relaxation of thermomechanical stresses during creep.

In this way, the described method makes it possible to obtain an environmental barrier layer comprising an ytterbium silicate whose production conditions are compatible with a substrate comprising free silicon.

The invention claimed is:

1. A part comprising a substrate of ceramic matrix composite material, the substrate comprising silicon, the part further comprising an environmental barrier formed on at least one surface of the substrate,
   wherein the environmental barrier comprises at least one compound selected from $Yb_{2-2\gamma}Gd_{2\gamma}SiO_5$ and $Yb_{2-2\gamma}Gd_{2\gamma}Si_2O_7$, where $\gamma$ is between 0.05 and 0.15, and wherein the environmental barrier further comprises alumina $Al_2O_3$, a molar alumina content being between 5% and 15% relative to a total environmental barrier composition.

2. The part according to claim 1, further comprising a bonding layer comprising silicon present between the surface of the substrate and the environmental barrier.

3. The part according to claim 1, wherein the substrate is a composite material part whose matrix comprises silicon carbide.

4. The part according to claim 1, wherein the environmental barrier jointly comprises the compounds $Yb_{2-2\gamma}Gd_{2\gamma}SiO_5$, $Yb_{2-2\gamma}Gd_{2\gamma}Si_2O_7$, where $\gamma$ is between 0.05 and 0.15.

5. The part according to claim 1, wherein the environmental barrier comprises only one of the compounds selected from $Yb_{2-2\gamma}Gd_{2\gamma}SiO_5$, $Yb_{2-2\gamma}Gd_{2\gamma}Si_2O_7$ where $\gamma$ is between 0.05 and 0.15.

6. The part according to claim 1, wherein the environmental barrier has a densification rate greater than or equal to 98%.

7. A method for protecting a substrate, a portion of which adjacent to a surface is made of a material comprising silicon, during high-temperature use in an oxidizing and humid environment, the method comprising forming an environmental barrier on the surface of the substrate,
   wherein the environmental barrier comprises at least one compound selected from $Yb_{2-2\gamma}Gd_{2\gamma}SiO_5$, $Yb_{2-2\gamma}Gd_{2\gamma}Si_2O_7$ where $\gamma$ is between 0.05 and 0.15, and alumina ($Al_2O_3$) in a molar content of between 5% and 15% relative to a total environmental barrier composition, the environmental barrier maintaining a majority solid phase up to at least 1400° C. and presenting a liquid phase at a temperature higher than or equal to 1300° C., so that a quantity of liquid phase ensures the self-healing capacity of the barrier for a temperature of use higher than or equal to 1300° C.

8. The method of claim 7, wherein forming the environmental barrier comprises a sintering step of ytterbium oxide powder ($Yb_2O_3$), gadolinium oxide powder ($Gd_2O_3$), an alumina powder ($Al_2O_3$) and a silica powder ($SiO_2$) at a temperature between 1300° C. and 1400° C.

9. The method according to claim 7, further comprising a step for obtaining a bonding layer comprising silicon on the surface of the substrate, prior to forming the environmental barrier.

10. The part according to claim 1, wherein the environmental barrier layer has a composition lying, in the $Yb_2O_3$—$Al_2O_3$—$SiO_2$ ternary diagram, on an isopleth from ytterbium disilicate to mullite, with some of the ytterbium being substituted by gadolinium.

11. The part according to claim 1, wherein a composition of the environmental barrier is selected such that the environmental barrier maintains a majority of solid phase up to at least 1400° C. and presents a liquid phase at a temperature higher than or equal to 1300° C., so that a quantity of liquid phase ensures self-healing capacity of the environmental barrier for a temperature of use higher than or equal to 1300° C.

12. The part according to claim 11, wherein an amount of liquid phase is between 5% and 40% by mass relative to a total mass of the environmental barrier for a temperature between 1350° C. and 1400° C.

* * * * *